(12) United States Patent
Pepin et al.

(10) Patent No.: US 7,467,373 B2
(45) Date of Patent: Dec. 16, 2008

(54) GLOBAL OBJECT SYSTEM

(75) Inventors: Brian K Pepin, Seattle, WA (US); Shawn P Burke, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 547 days.

(21) Appl. No.: 10/967,724

(22) Filed: Oct. 18, 2004

(65) Prior Publication Data
US 2006/0101444 A1 May 11, 2006

(51) Int. Cl.
G06F 9/44 (2006.01)
(52) U.S. Cl. .................................. 717/108; 717/107
(58) Field of Classification Search ......... 717/106–109, 717/114, 116, 117, 165
See application file for complete search history.

(56) References Cited

U.S. PATENT DOCUMENTS

| | | | |
|---|---|---|---|
| 6,292,937 B1* | 9/2001 | Sakata et al. | 717/116 |
| 6,463,480 B2* | 10/2002 | Kikuchi et al. | 719/315 |
| 6,480,856 B1* | 11/2002 | McDonald et al. | 707/100 |
| 6,523,934 B1* | 2/2003 | Beauchamp et al. | 347/37 |
| 6,826,600 B1* | 11/2004 | Russell | 709/213 |
| 6,922,200 B1* | 7/2005 | Marques | 345/619 |
| 6,922,824 B2* | 7/2005 | Swetland | 717/117 |
| 7,380,237 B2* | 5/2008 | Goring et al. | 717/115 |
| 2001/0056457 A1* | 12/2001 | Kikuchi et al. | 709/104 |
| 2002/0198858 A1* | 12/2002 | Stanley et al. | 706/50 |
| 2003/0121024 A1* | 6/2003 | Hill et al. | 717/107 |
| 2003/0163603 A1* | 8/2003 | Fry et al. | 709/328 |
| 2003/0237079 A1* | 12/2003 | Aggarwal et al. | 717/158 |
| 2004/0015817 A1* | 1/2004 | Kress et al. | 717/101 |
| 2005/0278339 A1* | 12/2005 | Petev et al. | 707/10 |
| 2005/0289166 A1* | 12/2005 | Stanley et al. | 707/100 |
| 2006/0048103 A1* | 3/2006 | Archambault et al. | 717/131 |

OTHER PUBLICATIONS

Matthew Fuchs, "Object Oriented Programming Using XSD and XSLT", Dec. 7-12, 2003, XML Conference & Exposition 2003, pp. 1-12.*
Hericko et al. "Object serialization analysis and comparison in Java and .NET", Aug. 2003 ACM Sigplan Notices, vol. 38 Issue 8, pp. 44-54.*
Gordon et al. "Validating a Web Service Security Abstraction by Typing", Nov. 2002, ACM, XMLSEC, pp. 18-29.*

(Continued)

*Primary Examiner*—Wei Zhen
*Assistant Examiner*—Anna Deng
(74) *Attorney, Agent, or Firm*—Amin, Turocy & Calvin, LLP

(57) ABSTRACT

A system and/or methodology to publish and share global objects in a visual designer is provided. A global object is an object that is available anywhere in the development project, rather than being local to a class or user interface element. Aspects of the invention are directed to a mechanism where global objects can be published, queried and/or used by individual visual designers. Additionally, aspects are directed to systems and/or methodologies where changes to those global objects can be made in such a way that they can be automatically updated in the designer. An alternate aspect of this mechanism can integrate with visual designers such that the designer itself does not need to be modified to accommodate the presence of a global object.

36 Claims, 7 Drawing Sheets

OTHER PUBLICATIONS

System Namespace, http://msdn.microsoft.com/library/default.asp?url=/library/cn-us/cpref/html/frlrfsystem.asp, 8 pages. last view on Jul. 13, 2005.

ITypeInfo Interface, http://msdn.microsoft.com/library/default.asp?url~/library/en-us/automat/hrm/chap9_24kl.asp, 1 page. last viewed on Jul. 13, 2005.

* cited by examiner

GLOBAL OBJECT SYSTEM

CROSS-REFERENCE TO RELATED APPLICATIONS

This application is related to pending U.S. patent application Ser. No. 10/970,415 entitled "Virtual Twos" filed on Oct. 20,2004, the entirety of which is incorporated by reference herein.

TECHNICAL FIELD

This invention is related to computer systems and more particularly to a system and/or methodology to generate, publish and/or employ global objects in a visual designer environment.

BACKGROUND OF THE INVENTION

As distributed object systems have become more popular, the ability to employ development tools with user interface (UI) elements has increased. For example, applications exist that include comprehensive tool sets for rapidly building and integrating web services, personal computer applications and web solutions. More particularly, development tools often include visual designers used to design user interface elements.

Conventionally, these visual designers focus only on the task at hand. However, when designing an application, a developer often needs to link the UI being designed to external objects such as data sources, images and other resources. Because the visual designer is designed to work with running instances of objects, there is no way for multiple designers to share resources from other locations within the development project. Therefore, there exists a need for a system that provides a mechanism for global objects (e.g., located elsewhere in the development project) to be shared and used locally by visual designers.

Over the years, attempts have been made to provide a visual designer that prompted rapid application development (RAD) however, these systems have been centered around a specific UI and did not integrate well with other shared resources within the development project environment. Today however, applications tend to be built so that there is a lot of sharing between UI elements and other sections of the application. Therefore, there is a substantial unmet need to extend the RAD experience to these other areas of the application development cycle thus increasing the value of the system by saving developer time. Thus, there exists a substantial unmet need for a system and/or methodology that employs global objects to effect these sharing aspects.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, comprises a system and/or methodology to publish and share global objects. A global object is an object that is available anywhere in the development project, rather than being local to a class or user interface element. By way of example, global objects can be database connections, resources, web services, etc. Aspects of the invention describe a mechanism where global objects can be published, queried and/or used by individual visual designers. Additionally, aspects are directed to systems and/or methodologies where changes to those global objects can be made in such a way that they can be automatically updated in the designer. An alternate aspect of this mechanism can integrate with visual designers such that the designer itself does not need to be modified to accommodate the presence of a global object.

In another alternate aspect, a system that facilitates employing global objects is provided. The system includes a global object service component that facilitates delivery of one or more global objects in response to a request. The request can be user and/or application generated. Additionally, the system includes one or more global object provider components that, in response to the request, generates the one or more global objects.

In yet another aspect, the system can include a factory component that maintains the one or more global object provider components. It will be appreciated that the factory component can be located remotely from the global object service component. It will also be understood and appreciated that one of the global objects can be of any type including, but not limited to, an XSD, RESX object or the like.

In yet another aspect, the global object service component can include a query component that facilitates generation of a query that is employed in connection with identifying the one or more global object provider components. These global object provider components can be maintained within a global object factory component. Additionally, the global object service component can include a table that identifies one or more global object providers capable of generating global objects that derive from a predefined type.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
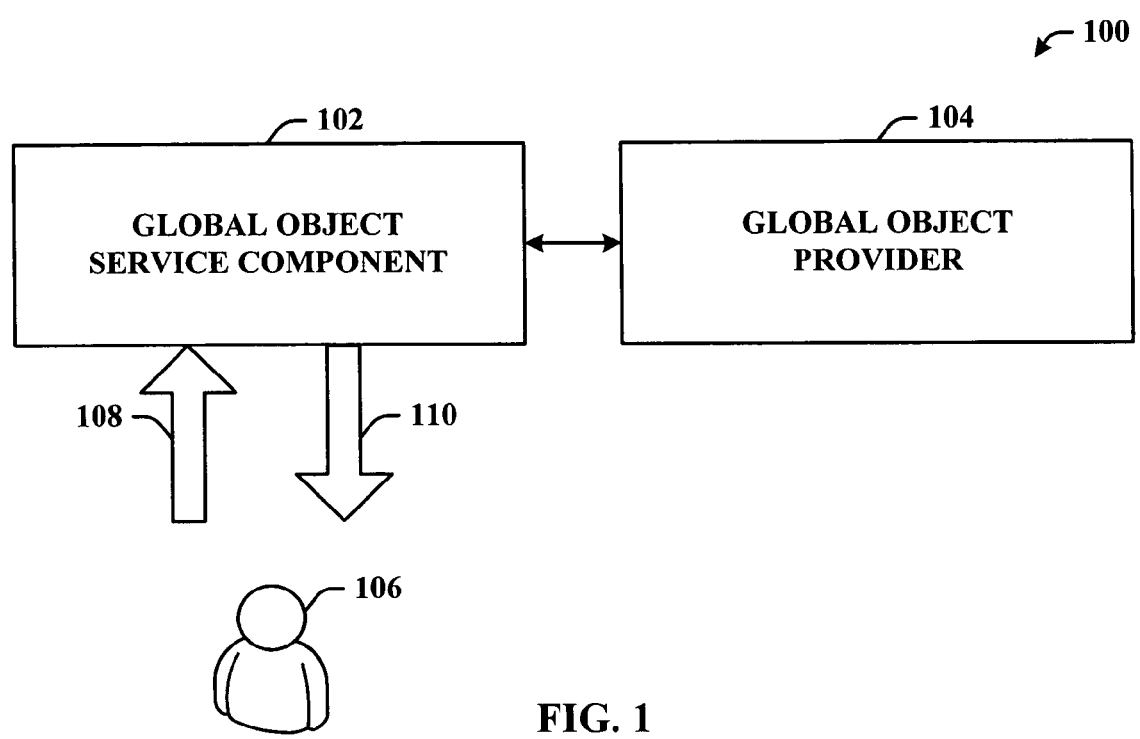
FIG. 1 illustrates a general component block diagram of a system for sharing global objects in accordance with an aspect of the invention.

The following terms are used throughout the description, the terminology and definitions are provided herein to assist in understanding various aspects of the subject invention.

Deserialization refers to the act of interpreting source code to create a live object. It is to be understood that this interpretation can be a simple, direct interpretation of the statements. Additionally, it can involve redirection to create a different type of object. For example, one designer environment, the line "new ResourceManager(this)" in the form specification actually creates a different type of resource manager.

Designer Reload refers to the situation when the type of a live object in the designer changes. In this situation, the designer shuts down and reloads again by deserializing the source code. Types can change when a project is rebuilt. Designer reloads can be undesirable because they are usually slow and can destroy a user undo stack.

Global Object refers to an object whose instance is not per-form, but rather can be per-project.

Live Object refers to an object instance in the designer. The designer uses real object instances. In accordance with the subject invention, this can be an instance of a real type, or it may be an instance retrieved from a virtual type.

Serialization refers to the act of taking a live object and generating source code that represents how that object is currently configured. Executing the source code should create an object configured in the same manner as the live object.

Virtual Type refers to an object that can stand in for a type when the real type is not available. Virtual types can act like normal types from a reflection standpoint. The concept and functionality of the Virtual Type is described in the aforementioned Related Application.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Aspects of the subject invention are directed to a system (e.g., architecture) for exposing global objects to designers. As discussed supra, a global object can be referred to as an object that is published for an entire project, rather than for a single form. By way of example, data sources coming from a graphical programming language "My" initiative can be referred to as global objects. As well, the project-wide resource files a Windows-brand operating system form provides can be referred to as global objects. It will be understood that because global objects can be global to a project, they can therefore be single-instanced.

Additionally, global objects can be accessed via a static method or property on a class. Further, global objects can be custom types that are automatically generated by the project system. It will also be appreciated that global objects can often change as a result of actions in other files within the project. For example, in one aspect, global objects can be as follows: DataSet cust=Customers.DefaultInstance, String error=MyAppResoucrs.ErrorString, and Bitmap logo=MyAppResources.ProductLogo.

As previously noted, there is another form of global object that can be referred to as a "global type." As described herein, a global type can be a standard instanced object, but the type for this object can be derived from a project in the solution or generated code. Although attempts have been made to expose these types through existing project references systems, these systems have several drawbacks because they are using real, compiled types. By way of example, global types can be as follows: DataSet cust=new CustomerDataSet( ).

Although many of the aspects and examples described herein are directed toward specifc-brand design environments, it is to be appreciated that the concepts and innovations described herein can be applied to and employed within any development (e.g., visual designer, visual web development) environment known in the art without departing from the scope and/or functionality of the claimed invention. As well, although aspects of the subject invention are directed to RESX (resource extension) and XSD (XML-Schema) global objects, it is to be appreciated that the systems, method and functionality described herein can be employed with reference to any form of global object.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

There are three sub-features described with reference to the subject specification. First, the Global Object API (application program interface) component refers to the API presented to clients who wish to publish or use global objects. For example, the Global Object API refers to the API exposed to a development client in order to publish or use global objects. Second, the Virtual Type API component, described in the aforementioned Related Application, refers to the API exposed to a client that allows the shape of a type to be shared without actually creating that type via compilation or reflection emit. The third sub-feature described is an integration and/or implementation of a global object provider for RESX files.

Referring now to FIG. 1, a schematic block diagram of a system that facilitates generating, updating and delivering global objects in accordance with an aspect of the subject invention is shown. Generally, the system 100 of FIG. 1 can include a global object service component 102 and a global object provider component 104. In operation, a user 106 (or application) can request a global object from the global object service component 102. For instance, the request can be for references (e.g., global objects) that derive from a specific type (e.g., bitmap). In turn, the global object service component 102 can communicate with the global object provider component 104 in order to obtain requested global objects in accordance with the request 108. The global object provider 104 can be invoked and therefore, transfers the requested global objects 110 to the global object service 102 as illustrated. The global object service 102 thus can make the global objects 110 available to the user 106.

In accordance with an aspect of the subject invention, a simple API component or interface component can be employed for registering global objects that can be used by a data team and client team as described herein. Additionally, the system 100 is provided and can be employed to effect a change of one or more global objects frequently without requiring a reload of the designer. Moreover, in accordance with aspects of the subject invention, global objects can be serialized and deserialized in code generation. These aspects will be described in greater detail infra.

The global object API described is directed toward a system and/or methodology that can be employed to register and discover global objects for a project. The aforementioned Related Application directed to a Virtual Type API describes an API to create a virtual type. Virtual types can create types based on an arbitrary base class (e.g., ResourceManager or DataSet) and have those instances configured with data from the project. Virtual types can allow global data sources and resources to change without causing the designer to reload. Finally, the Resource Picker Integration describes a system and/or methodology of updating a resource picker component to support global objects.

The following exemplary scenarios are included to provide context to the invention. It is understood that the exemplary scenarios are not provided to limit the scope and/or functionality of the invention in any way. Those skilled in the art will appreciate that the novel concepts and functionality described herein can be employed in connection with scenarios other than those described below without departing from the scope of the described and claimed invention.

In a first scenario, suppose the user 106 requests and receives a global object that derives from bitmap through the global object service component 102. In accordance with this aspect, this bitmap "lives" in an application specific to the user 106 and can be shared between all designers in the project. When the user 106 saves the form, the following line of code is emitted into the form code: Me.BackgroundImage=TealButtonsRuleResources. TealBitmap—Subsequently, when user 106 closes and re-opens the project, the background image of the form is still set to the bitmap (e.g., TealBitmap).

Behind the scenes a global object is generated. More particularly, a global object is automatically fabricated in this scenario. The designer team can create a GlobalObjectProvider 104 capable of fabricating global objects from RESX files. It will be appreciated that the strongly typed resources generated from a RESX file can be in the form of a non-creatable class with all static properties. The global object provider 104 can fabricate the following two global objects for each project-level RESX file. First, a global object for the static class wrapping the resource file can be provided. Second, a global object for the return value of each static property of the resource class can be provided.

It should be understood that because there is no instance of the all-static global object, the latter set of global objects is provided. The all-static class can be offered as a global object and can offer static properties via a virtual type. The return values from these properties should have been obtained via the instance property of each of the various global objects. This complexity is particularly important because static types like this are not actually compiled, but all global objects are explicitly tracked so that their serialization and deserialization can be successful.

In a second exemplary scenario, a Customers table can be exposed in a DataSource drop down. In this scenario, user 106 sets up a global Customers table using a data design environment. User 106 drags a DataGridView onto his form and drops open the DataSource property. "Customers" is listed as a data source. User 106 chooses it, and the following code is generated
Me.DataGridView1.DataSource=Customers.Instance.

Behind the scenes a global object provider 104 has been registered that is capable of creating a global object for an XSD file. The global object is a virtual type that offers a single static property—an instance. Each form designer can maintain a modified IReferenceService that offers global objects as references, which can allow user 106 to pick the global object from a drop-down. This reference list can be made available via the global object service 102. The reference service (e.g., global object service 102) is intelligent and can exclude those objects in a global object table that are already in the design container of the global object service 102. When a global object is chosen from the global object table, it can be sited, if needed, and returned from the reference service. The GlobalObject itself registered a custom serializer for the instance of the data set returned from Customers.Instance. Therefore, this exemplary data set can be correctly serialized as "Customers.Instance".

A third scenario is directed to changing a Customers table schema that has already been bound. Suppose user 106 sets DataGridView to point to the Customers table, but has updated the schema for the table. As expected, user 106 sees that the DataGridView contains the updated schema automatically.

Figure 2:
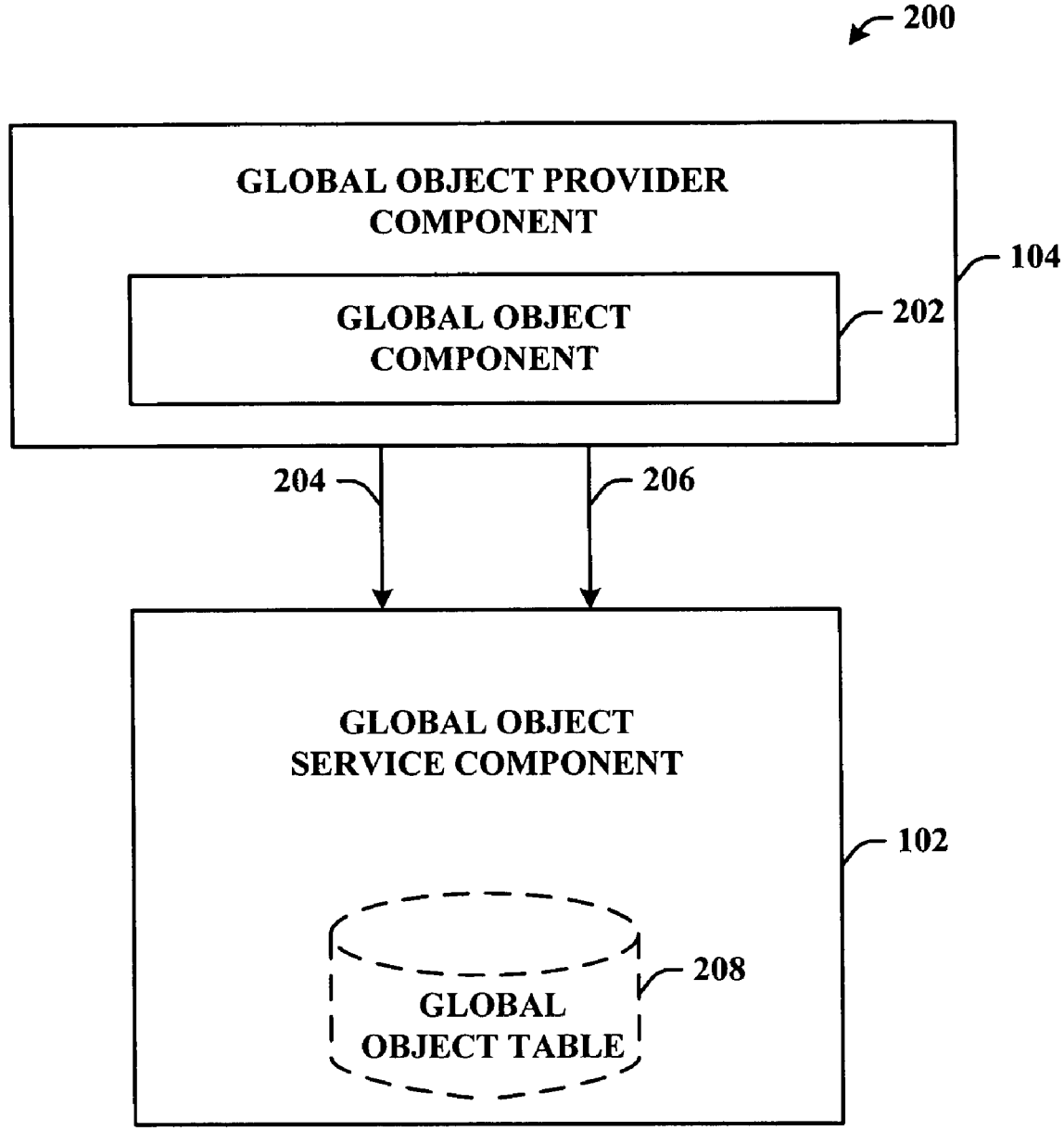
FIG. 2 illustrates an exemplary block diagram of a system for updating global objects in accordance with a disclosed aspect.

Turning now to FIG. 2, behind the scenes, when a change is made to the XSD schema, the data team global object 202 can raise a pair of Changing and Changed events 204, 206. These events 204, 206 will cause the global object service 202 running on the designer to announce to any references of the data source to update to the new value.

More particularly, the global object 202 announces a change via the changing notification 204. In one aspect the global object service 102 can record the instance values and a location where the instance is applied to properties in the global object table 208. The global object 202 announces that the change is complete via changed notification 206. Finally the global object service 102 announces the changes and effects the changes to the new instance of the global object 202. It will be appreciated that cross-domain applications can exist and will be discussed infra.

A fourth scenario is directed to a situation whereby a customer routes property values to a configuration file. Suppose user 106 sets up a connection between the application configuration file and the text property on the form through the typed settings designer. The result of this connection is that the code generated of the form changes to the following:
this.Text=ApplicationSettings.Form_Text Behind the scenes a global object provider 104 has been registered that is capable of creating a global object 202 for the application configuration file. In one aspect, the global object 202 can be a virtual type that offers a series of static properties, the value of each being a global object itself. A custom property can be added to the form to choose designer settings. When this property is configured, the return value from one of the static properties of the global object 202 will be assigned to the correct property on the form.

The aforementioned scenarios are provided to add context to aspects of the invention and will become more apparent upon a review of the detailed descriptions and other exemplary aspects that follow.

Turning now to a discussion of a Global Object API. The Global Object API component can be employed to facilitate publication, modification and/or use of global objects. By way of example, the Global Object API component refers to the API exposed to a development environment client in order to publish and/or use global objects.

As described in greater detail infra, in accordance with exemplary aspects, five basic components can be included in the system (e.g., Global Object API)—1) Global Object Service Component, 2) Global Object Provider Component, 3) Global Object Factory Component, 4) Global Object Component, 5) Global Object Provider Attribute. Each of these components will be discussed in detail with reference to FIG. 3 below.

Figure 3:
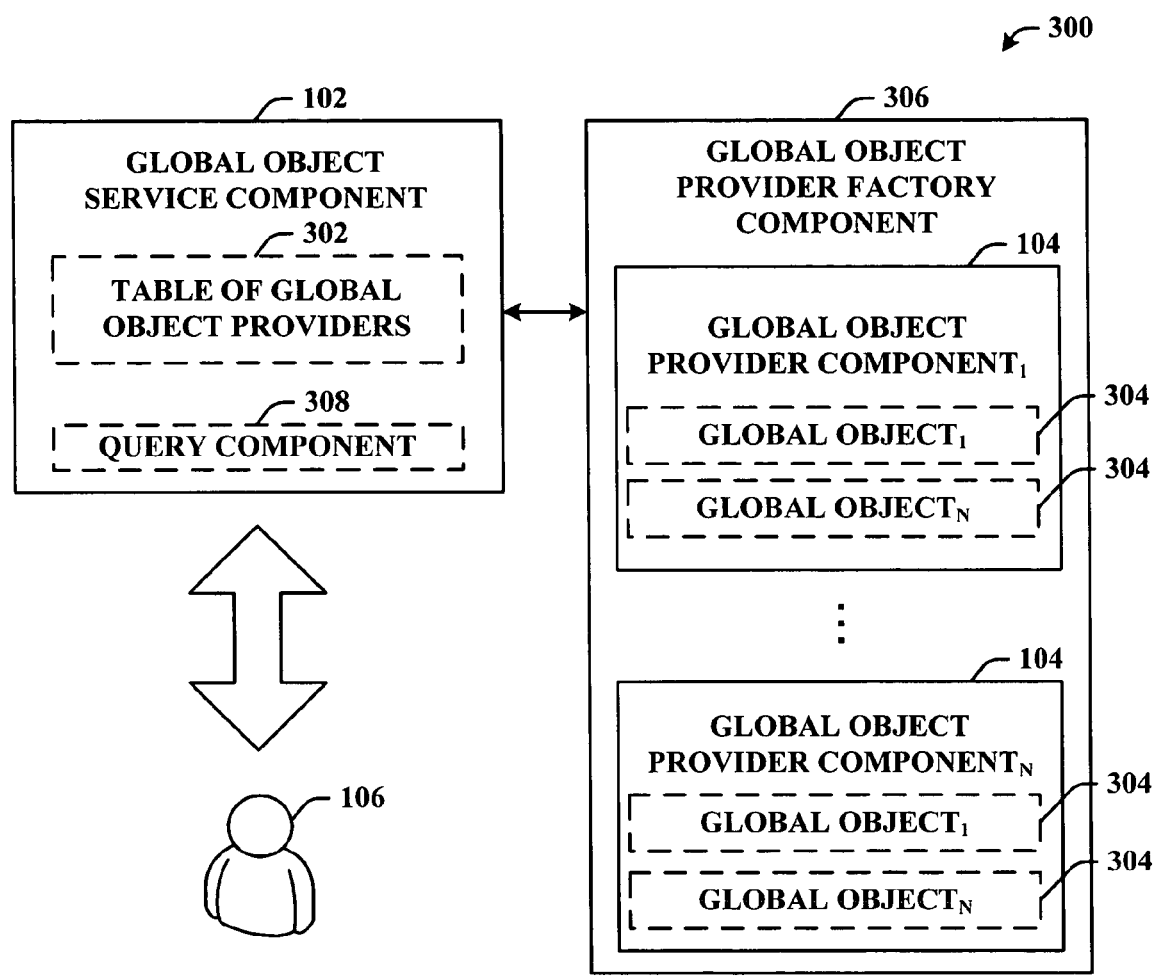
FIG. 3 illustrates an exemplary schematic block diagram that illustrates a provider factory and multiple providers for generating a variety of global objects in accordance with a disclosed aspect.

With reference now to FIG. 3, system 300 is shown. Global object service component 102 is the service responsible for maintaining a table 302 of global object providers 104. The designer loader can add this service 102 to the service container during load. In one aspect, the service 102, specifically the table 302, can be queried by the IReferenceService and ITypeResolutionService objects as needed.

With continued reference to FIG. 3, a global object provider component 104 is an object that can provide global objects 304 to designers. As illustrated, a global object provider factory 306 can be included. The global object provider factory 306 can have 1 to N global object providers, where N is an integer. It will be appreciated that global object provider components 1 to N can be referred to individually or collectively as global object provider(s) 104. It will be understood that disparate global object providers 104 can be resident with respect to the global object factory 306 whereby, the disparate global object providers 104 can generate distinct global objects (e.g., RESX, XSD).

In operation, the global object providers 104 can be queried by the global object service 102 on-demand. In other words, when a user 106 asks for a list of a particular type of global object 304 or for global objects 304 that derive from a particular type, the query component 308 can be employed to facilitate querying the global object provider factory 306 to identify appropriate global object provider(s) 104 capable of generating matching global objects 304.

The global object provider factory component 306 can facilitate delivery of a collection of global object provider components 104. This factory component 306 can be accessed by the global object service component 102 to build a list of providers 104 that can be employed to generate appropriate global objects 304. An attribute component can be employed by the global object provider factory component 306 to declare (e.g., identify) global object provider components 104. Further, this factory component 306 can be global (e.g., there can a default implementation provided by the design package), but it can be replaced by the project context service provider if desired. This allows the project to control which global object provider components 104 are available. It is to be understood that the factory 306 can be located remotely if desired.

The global object component 304 illustrated in FIG. 3 is the global object itself. As illustrated, consistent with the global object providers 104, 1 to N global objects can exist—where N is an integer. As well, it is to be understood that each global object provider 104 can provide multiple global objects as illustrated in FIG. 3. A global object 304 is essentially a container that contains data about a global object. For example, a global object 304 can include, but is not limited to, its type, the ability to create an instance of the object and an event that can be raised when the object changes.

As noted supra, it is to be understood that global objects 304 can be applicable across application domains if desired. For at least this reason, it is contemplated and will be understood that the innovations and concepts discussed herein can be employed to implement designers in any domain. As well, the subject invention can be employed in multiple and/or cross-domain applications. In accordance thereto, alternative API aspects can be employed as appropriate without departing from the scope and functionality described herein.

Turning now to a more detailed discussion of the global object service component 102. In one aspect, the global object service component 102 can be an API used to announce the presence of global objects 304. Because persistence of global objects 304 must be specifically provided for in different serialization techniques, it can be appropriate for the designer loader to be responsible for creating the global object service 102. Therefore, when the loader is initialized, there can be one such service 102 added to the designer by the designer loader. This service 102 can later be queried by other objects to discover and/or create global objects 304.

Internally, the global object service 102 can effect several functions. The global object service 102 can query (e.g., via query component 308) the various global object providers 104 in search for global objects 304. Each global object 304 returned can be queried for a compatible serializer. If none is found, that global object 304 is discarded, as it cannot be serialized. The global object service 102 can maintain a table of global objects in connection with the table of global object providers 302. This table 302 can track the origination provider 104 location of each of the global objects 304. When a global object 304 is added to the table 302, the global object service 102 can listen to events on the global object 304. When a global object instance is created, the global object service 102 can add metadata to the instance to allow it to be serialized. By way of example, the serializer for the global object instance can be taken from a call to GetSerializer on the global object 304 itself.

The global object service 102 listens to the change events for each global object. As described with reference to FIG. 2 supra, when a change event is raised, the global object service can scan all components on the design surface looking for properties that reference the instanced global object and updates these to point to a new instance. In response to the changing and/or changed events, this procedure can be effected in two passes.

The first pass can be directed toward a changing event. During the changing event, the instance property of the global object class still points to the original instance. All properties on all components can be walked and those that reference the global object 304 will be recorded. The property values of the global object instance that are read/write and serializable can be shallowly recorded.

The second pass can be directed to a changed event. The new instance can be obtained from the global object instance property. Once obtained, a global object service or designer may apply property and object settings that were recorded during the prior changing event, thereby reconfiguring the new global object to match the old.

For global types, the same mechanism applies. However, refreshing objects for global types can be a bit more complex because there can be multiple instances for each global type. In this aspect, an additional table can be employed to do the update for each instance of each object. Finally, the global object service 102 component can listen to remove events from each global object or global type. When a remove is encountered, properties are again walked but this time the property value can be set to null.

An exemplary implementation of the global object service component 102 can be defined is as follows. It is to be appreciated that this exemplary aspect, and others that follow, is to provide context to the subject invention and is not intended to be limiting in any respect. Rather, the exemplary implementation(s) is provided for ease of understanding and for discussion and explanatory purposes only. As stated supra, although exemplary implementations are directed to a design environment, it will be appreciated that the components and concepts disclosed herein can be employed in connection with any application and/or design environment known, or which becomes known, in the art. With this in mind, the exemplary global object service component 102 can be implemented as follows:

```
public sealed class GlobalObjectService : IDisposable {
    public GlobalObjectService(IServiceProvider provider,
    Project project,
    Type serializerType);
    public GlobalObjectCollection GetGlobalObjects( );
    public GlobalObjectCollection GetGlobalObjects(Type baseType);
    public GlobalTypeCollection GetGlobalTypes( );
```

In the example provided supra, the GlobalObjectService class represents an exemplary public class. A constructor is provided and identified as GlobalObjectService. In accordance thereto, IserviceProvider provider argument refers to a service provider that can be used to obtain other services. The Project project argument refers to the project associated with the exemplary global object service 102. It will be appreciated that global objects 304 are "global" to a project. Finally, the Type serializer Type argument can be passed to the global object provider service 104 to enumerate providers that can offer the given serializer. This allows the global object service 102 to only offer global objects 304 that can be serialized using the current designer loader serialization mechanism.

Continuing with the exemplary implementation, the GetGlobalObjects method can reference the type baseType argument as illustrated. If specified, the returned set of global objects 304 can all be restricted to objects that derive from the given base type. If not specified, all global objects 304 will be returned. Essentially, the method can return a desired collection of global objects 304. This collection can be built each time the method is called, thus it can remain in sync with the set of global object providers 104. As noted, if a base type is specified, the collection will only consist of global objects 304 derived from the given base type. It will be appreciated that that these conditions can be left to the discretion of the global object provider 104.

It will be understood that GlobalObjectService will not validate that the global object providers 104 have returned a valid set of base types. In the example, GetGlobalObjects that takes no arguments and simply calls GetGlobalObjects(null). This method will not return a null collection object. Similarly, the GetGlobalTypes method can return a collection of global types. This collection can be built each time this method is called, thus it can remain in sync with the set of global object providers. This method will not return a null collection object.

Figure 4:
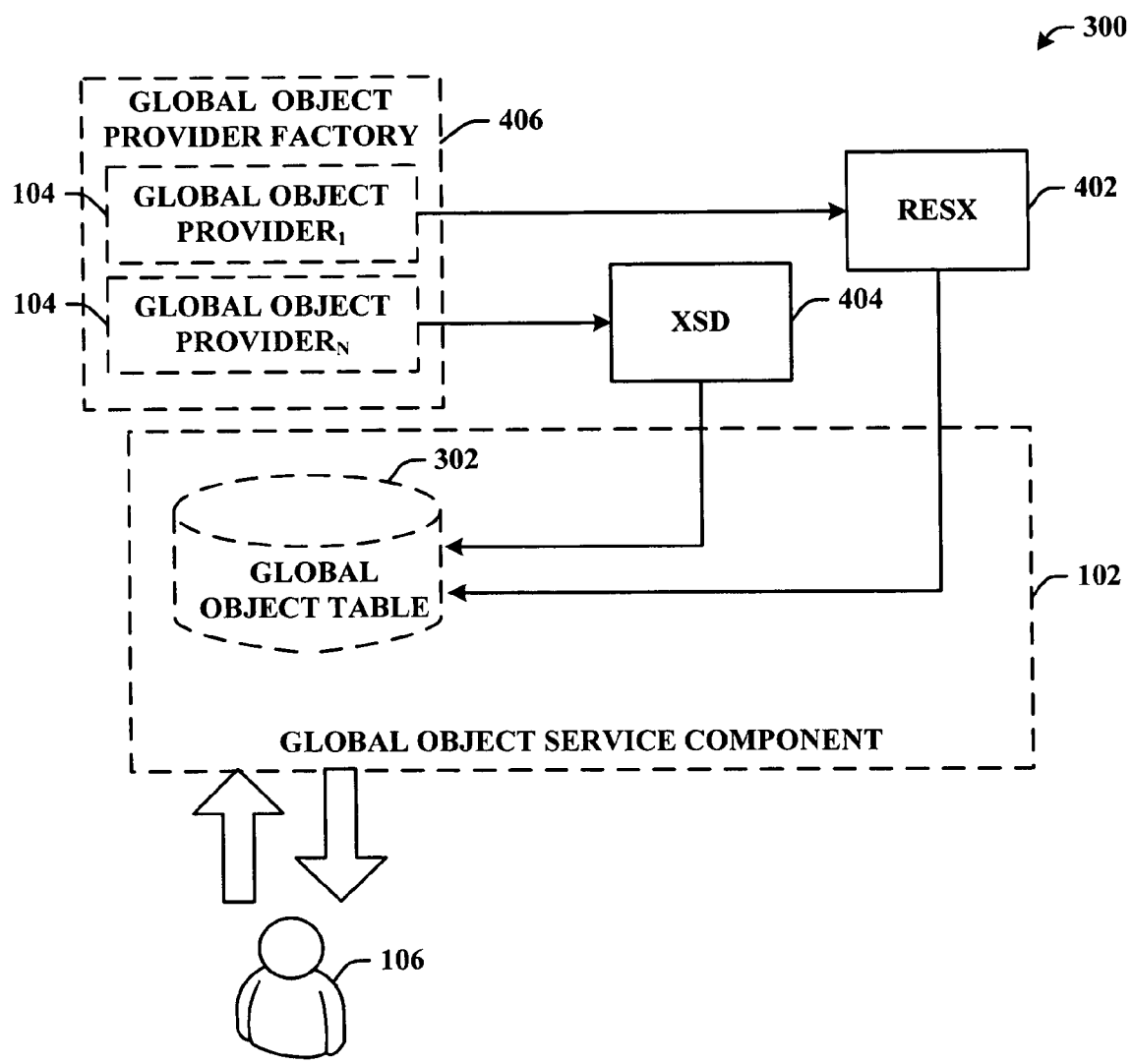
FIG. 4 illustrates an exemplary diagram having two distinct global object providers in accordance with an alternate aspect.

Turning now to a discussion of the global object provider 104. The global object provider 104 can provide zero or more global objects 304 to the global object service 102. As illustrated in FIG. 4, there can be one global object provider 104 for all project-level resource files 402 (e.g., RESX), and another 404 for strongly typed datasets (e.g., XML). In a one designer environment, global object providers 104 can be created via the ILocalRegistry construct and can be sited via IObjectWithSite upon creation. When a provider 104 is no longer needed by a global object service 102, the global object service 102 can dispose of the provider 104. When queried by the global object service 102, a global object provider 104 can return a collection of global objects 304. The global object provider 104 can return the same instance of a global object 304 as long as it represents the same object.

An exemplary aspect of a global object provider component 104 can be implemented follows:

```
public abstract class GlobalObjectProvider : MarshalByRefObject,
    IDisposable,
    Studio.OLE.Interop.IObjectWithSite {
    public event EventHandler CollectionChanged;
    public void Dispose( );
    protected virtual void Dispose(bool disposing);
    protected object GetService(Type serviceType);
    public GlobalObjectCollection GetGlobalObjects(Project
project);
    public GlobalObjectCollection GetGlobalObjects(
        Project project,
        Type baseType);
    protected abstract GlobalObjectCollection
GetGlobalObjectsCore(
        Project project,
        Type baseType);
    public GlobalTypeCollection GetGlobalTypes(Project project);
    protected virtual GlobalTypeCollection
GetGlobalTypesCore(Project project);
    protected virtual void OnCollectionChanged(EventArgs e);
```

In the example, a CollectionChanged event can be raised when the number of objects in either the global object or global tree collection changes. The Dispose method includes a System.Boolean disposing argument. If true, the object will be disposed. If false, it will be finalized. The GetService method can return an instance of the requested service or null if no such service exists. Additionally, the GetGlobalObjects method can return a collection of global objects 304. If a base type is specified, the collection should only include global objects 304 derived from the given base type. GetGlobalObjects that takes only a project simply calls GetGlobalObjects (project, null). This should not return a null collection object.

Continuing with the example, the GetGlobalObjectsCore method can return a collection of global objects 304. If a base type is specified, the collection should only consist of global objects derived from the given base type. This method should not return a null collection object. This will be validated in the GetGlobalObjects methods that call this method.

The GetGlobalTypes method can return a collection of global types. This simply performs argument checking and calls GetGlobalTypesCore. Moreover, the GetGlobalTypesCore method can return a collection of global types for the project. The default implementation returns an empty collection. Finally, the OnCollectionChanged method can raise the CollectionChanged event.

Turning now to a discussion of a global object collection component. The global object collection can be delivered via a global object provider factory component 306. The global object collection can be a strongly typed collection of global objects 304. It will be appreciated that the collection can be read-write or read-only. A read-write collection can be cheaply passed to the constructor of the global object collection to make a read only version without copying the collection.

Following is an exemplary implementation of a global object collection:

```
[Serializable]
public sealed class GlobalObjectCollection : IList, ICollection,
IEnumerable
    public GlobalObjectCollection( );
    public GlobalObjectCollection(GlobalObject[] items);
    public GlobalObjectCollection(GlobalObjectCollection items);
    public GlobalObjectCollection(GlobalObject[]items, bool
readOnly);
    public GlobalObjectCollection(GlobalObjectCollection items,
bool readOnly);
    public int Count { get; }
    public bool IsFixedSize { get; }
    public bool IsReadOnly { get; }
    public bool IsSynchronized { get; }
    public object SyncRoot { get; }
    public GlobalObject this[int index] { get; set; }
    public int Add(GlobalObject item);
    public void AddRange(GlobalObject[ ] items);
    public void AddRange(GlobalObjectCollection items);
    public void Clear( );
public void CopyTo(GlobalObject[ ] array, int index);
    public bool Contains(GlobalObject item);
public IEnumerator GetEnumerator( );
    public int IndexOf(GlobalObject item);
    public void Insert(int index, GlobalObject item);
    public void Remove(GlobalObject item);
    public void RemoveAt(int index);
```

The example above represents a standard strongly typed collection of global objects 304. If readOnly is passed as true, the collection cannot be modified. The default value for readOnly if not passed is false.

Now with reference to a global type collection component, similar to the global object collection discussed supra, the global type collection is a strongly typed collection of global type objects. The collection can be read-write or read-only. A read-write collection can be cheaply passed to the constructor of global type collection to make a read only version without copying the collection.

Following is an exemplary aspect of a global type collection:

```
[Serializable]
public sealed class GlobalTypeCollection : CollectionBase {
    public GlobalTypeCollection ( );
    public GlobalTypeCollection (GlobalType[ ] items);
    public GlobalTypeCollection (GlobalTypeCollection items);
    public GlobalTypeCollection (GlobalType[ ]items, bool
readOnly);
    public GlobalTypeCollection (GlobalTypeCollection items, bool
readOnly);
    public int Count { get; }
    public bool IsFixedSize { get; }
    public bool IsReadOnly { get; }
    public bool IsSynchronized { get; }
    public object SyncRoot { get; }
    public GlobalType this[int index] { get; set; }
    public int Add(GlobalType item);
    public void AddRange(GlobalType[ ] items);
    public void AddRange(GlobalTypeCollection items);
    public void Clear( );
public void CopyTo(GlobalType[ ] array, int index);
    public bool Contains(GlobalType item);
```

-continued

```
public IEnumerator GetEnumerator( );
    public int IndexOf(GlobalType item);
    public void Insert(int index, GlobalType item);
    public void Remove(GlobalType item);
    public void RemoveAt(int index);
```

The example above represents a standard strongly-typed collection of types. If readOnly is passed as true, the collection cannot be modified. The default value for readOnly if not passed is false.

Referring now to a global type component, the global type class can provide data about a specific global type. Global types can be created directly but sometimes need to be tracked for type changes, additions and removals. In an exemplary aspect, global types can inherit from MarshalByRefObject whereby a global object 304, which derives from global type, can have its instances marshal across domains.

An exemplary global type implementation is as follows:

```
public abstract class GlobalType : MarshalByRefObject {
    protected GlobalType(Type objectType);
    public Type ObjectType { get; }
    public event EventHandler Changed;
    public event EventHandler Changing;
    public event EventHandler Removed;
    public event EventHandler Removing;
    protected void ClearObjectType( );
public override bool Equals(object o);
public override int GetHashCode( );
protected virtual Type GetObjectType( );
    protected virtual void OnChanged(EventArgs e);
    protected virtual void OnChanging(EventArgs e);
    protected virtual void OnRemoved(EventArgs e);
    protected virtual void OnRemoving(EventArgs e);
    protected virtual void PerformChange ( );
    protected virtual void PerformRemove ( );
```

In this example cross-domain example, the Global Type constructor (e.g., Type objectType) can effect generation of a new GlobalType instance. The ObjectType property specifies return of the type of this global type.

With respect to a changing event, the event is raised when the global type contained in this GlobalType class changes. A change causes the type of the global type to be changed. A change event begins by the Internal GlobalType code calling PerformChange. Next, PerformChange invokes OnChanging, calls ClearObjectType and finally invokes OnChanged.

Turning now to a removed event of the exemplary aspect, this event is raised when the global type contained in this GlobalType class is being removed and will no longer be available. For example, if an XSD file is removed from the project, the global type representing it is also removed. In operation, Internal GlobalType code calls PerformRemove. Next, PerformRemove invokes OnRemoving, calls ClearObjectType and invokes OnRemoved.

Similarly, a Removing Event is raised when the global type contained in this GlobalType class is being removed and will no longer be available. For example, if an XSD file is removed from the project, the global type representing it is also removed. The procedure for removing a global type starts by the Internal GlobalType code calling PerformRemove. Next, PerformRemove invokes OnRemoving, clears instance value, if present, and finally invokes OnRemoved.

A ClearObjectType method clears the ObjectType property. This method is invoked during PerformChange and PerformRemove, but can be invoked manually in cases where events are to be raised manually. An Equals method is an override of Object.Equals. This can compare equality of two global types by comparing their ObjectType properties. The GetHashCode method is an override of Object.GetHashCode. This generates a hash code based on the ObjectType property value hash codes.

The GetObjectType method can be called by the ObjectType property to retrieve the type of this global type. Once retrieved the value can be cached until PerformChange is called. The default implementation of this method returns the type that was passed into the GlobalType constructor. The OnChanged method can invoke the changed event handler. Similarly, the OnChanging method can invoke the Changing event handler. Next, the OnRemoved method can invoke the Removed event handler and likewise, the OnRemoving method can invoke the Removing event handler.

The PerformChange method is intended to be called by deriving classes when the shape of a global type changes. In operation this method calls OnChanging, calls ClearType and finally, calls OnChanged. Similarly, a PerformRemove method is intended to be called by deriving classes when a global type is no longer available. This method raises events that allow parties using the global object to detach. In doing so, this method calls OnRemoving, calls ClearType and finally, calls OnRemoved.

With reference now to a discussion of the global object component 304. The global object class can provide data about a specific global object component 304. Although a user can perceive global objects 304 as global, which is consistent with how they behave at runtime, it will be appreciated that, at design time, they are actually instanced per-designer. This functionality allows the designers to maintain their own copies and remain isolated. The global object service 102 interacts with instances of global objects 304 in order to create these per-designer global object instances.

In the exemplary environment, a global object component 304 can inherit from MarshalByRefObject in anticipation of its need to marshal across application domains. Although this aspect is directed toward a multiple application domain aspect, the features and functionality can be applied to a single application domain example without departing from the scope of the claims appended hereto. The actual instantiation of a global object 304 would happen in the default domain. Further, the global object instance must be serializable thus enabling it to be marshaled across the domain boundary.

An exemplary implementation of a global object 304 is as follows:

```
public abstract class GlobalObject : GlobalType {
    protected GlobalObject(Type objectType, string objectName);
    public object Instance { get; }
    public string Name { get; }
    public event EventHandler Created;
    protected void ClearInstance( );
    protected virtual object CreateInstance ( );
    public override bool Equals(object o);
    public override int GetHashCode( );
    public object GetSerializer (Type serializerType);
    public abstract object GetSerializerCore (Type serializerType);
    protected virtual void OnCreated(EventArgs e);
    protected override void PerformChange ( );
    protected override void PerformRemove ( );
```

In accordance with the exemplary aspect supra, the GlobalObject constructor can create a new GlobalObject instance. With respect to the Instance Property, demand creates the instance of this global object 304. It will be understood that that some global objects 304 can only provide static members—in which case Instance will return null. The Name property returns the recommend name of the global object 304. The actual name for this global object 304 can differ if there are conflicts or language limitations that prevent this name from being used. This name is only used at design time to identify the global object 304 to the user 106. Names can be unique for all global objects 304 within a given provider 104.

A Created event is raised when the Instance property is first accessed and a new instance of the global object 304 is created. If the global object 304 represents an object with all static members this event will never be raised. Raising this event occurs in the Instance property itself as outlined in the following exemplary pseudo-code:

```
if (instance == null) {
    instance = CreateInstance( );
    if (instance != null) OnCreated(EventArgs.Empty);
```

The ClearInstance method clears the instance property. This is usually invoked during PerformChange and PerformRemove, but may be invoked manually in cases where events are raised manually. On the other hand, the CreateInstance method can be called by the Instance property once to create a cached instance of the global object 304. This method can create an instance of the global object type and return the same. The instance returned is preferably serializable—whereby the caller validates the same. A default implementation of this method can call TypeDescriptor.CreateInstance to create an instance of the global object 304. It will be understood that override of this method is possible to populate the object with data.

The Equals method can override GlobalType.Equals. This method compares equality of two global objects by comparing the Name and ObjectType properties. Correspondingly, the GetHashCode method can override of GlobalType.GetHashCode. This method generates a hash code based on the Name and ObjectType property value hash codes.

The GetSerializer method can retrieve the serializer for the global object 304. This non-virtual method argument checks and delegates to GetSerializerCore. Additionally, it argument checks the return value from GetSerializerCore to ensure it is either null or a serializer of type serializerType. Serializers returned from GetSerializer must be serializable so they can marshal across domain boundaries as necessary. This serialization requirement can be enforced in GetSerializer. The GetSerializerCore method can retrieve the serializer for this global object. This method is called from CreateSerializer after it performs argument validation. The method should return a serializer of the specified type, or null if it does not support the serialization type.

The OnCreated method invokes the Created event handler. Further, the PerformChange method is intended to be called by deriving classes when the shape or data within a global object 304 changes. In operation, this method calls OnChanging, nulls the object instance and calls OnChanged. Likewise, the PerformRemove method is intended to be called by deriving classes when a global object 304 is no longer available. This method raises events that allow parties using the global object to detach. In operation, this method calls OnRemoving, nulls the object instance and Call OnRemoved.

The provide global object provider attribute component can be placed on a package to declare one or more global object providers 104. The RegPkg tool will use this attribute to add registration information about the global object provider 104. It is to be appreciated that this attribute should only be used for registration and does not affect runtime behavior. Additionally, this attribute should be placed on a package class.

An exemplary implementation of the attribute is as follows:

```
public sealed class ProvideGlobalObjectProviderAttribute :
RegistrationAttribute {
    public ProvideGlobalObjectProviderAttribute(Type
providerType);
        public Type ProviderType { get; }
```

With respect to the ProvideGlobalObjectProviderAttribute class, ProvideGlobalObjectProviderAttribute constructor creates a new attribute. The ProviderType property returns the provider 104 a type passed into the constructor. Accordingly, the following exemplary registry entries are created during registration of this attribute:

```
VSROOT\GlobalObjectProviders\{ObjectGuid}=<provider name>
VSROOT\CLSID\{ObjectGuid}
VSROOT\CLSID\{ObjectGuid}\@=ObjectType.FullName
VSROOT\CLSID\{ObjectGuid}\InprocServer32=mscoree.dll
VSROOT\CLSID\{ObjectGuid}\Class=ObjectType.FullName
VSROOT\CLSID\{ObjectGuid}\Assembly=ObjectType.Assembly.FullName
VSROOT\CLSID\{ObjectGuid}\ThreadingModel=Both
```

Turning now to a discussion of the global object provider factory component 306. The global object provider factory 306 implements an enumeration mechanism for global object providers 104. It will be appreciated that, in accordance with the exemplary environment aspect discussed herein, there is a default implementation of this service built into the environment. Those skilled in the art will understand that customization can be effected by identifying which global objects 304 should be returned by providing their own GlobalObjectProviderFactory in the project context. This procedure can preempt any service that is built into the design package.

In the exemplary implementation that follows, the GlobalObjectProviderFactory can look into the registry for all available global object providers 104. It is not necessary for the GlobalObjectProviderFactory to cache any data.

```
public abstract class GlobalObjectProviderFactory :
MarshalByRefObject {
    public abstract GlobalObjectProvider[ ] GetProviders( );
```

With respect to the GlobalObjectProviderFactory class the GetProviders method can facilitate return of an array of global object providers 104. This method should not return null. Upon implementation, global object providers 104 can return a union of any custom class a user desires to define and the return value from any static property or method on the defined class.

To provide context, following are a couple of exemplary aspects of implementations. The first example is directed to a Custom DataSet as follows:

```
public sealed class Customers : DataSet {
    private Customers __instance;
    private Customers( ) { }
    public static Customers Instance {
        if (__instance == null) __instance = new Customers( );
        return __instance;
```

In order to determine how many global objects to define, a formula that represents the union of 1) any custom class a user desires to define and 2) the return value from any static property or method on that class can be applied. Accordingly, using the formula it will be understood that there can be a custom class called "Customers" and a single static property called "Instance." Because the return value of Instance is just an instance of Customers, there is only a need to define one global object.

The second example is directed toward a strongly typed resource. For example:

```
public sealed class AppResources {
    private AppResources( ) { }
    public static Bitmap Logo { get; }
    public static Icon ApplicationIcon { get; }
    public static string ErrorMessage { get; }
```

Again, applying the formula above, there can be a custom class called "AppResources" and three static properties that all return unique values. Therefore, a total of four global objects 304 that the global object provider 104 must return. Accordingly, because AppResources is not itself created, the global object 304 for the AppResourcesClass will always return null from its Instance property.

Figure 5:
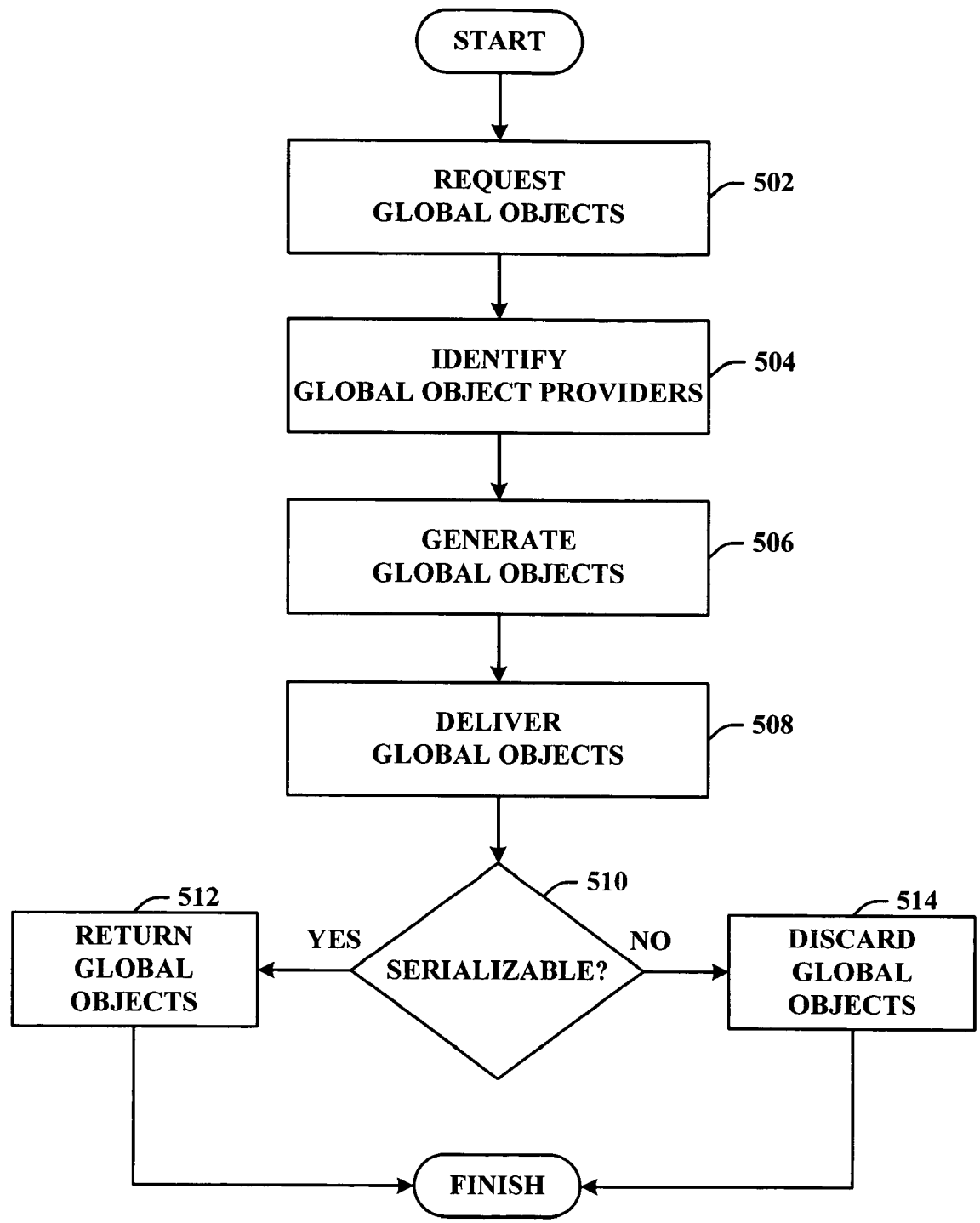
FIG. 5 illustrates an exemplary flow chart of procedures to request and deliver a global object in accordance with a disclosed aspect.

FIG. 5 illustrates a general flow chart of a methodology that facilitates the use of a global object in accordance with an aspect of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

At 502, a global object is requested. As discussed supra, this request can be generated by a designer either manually or automatically. As described in detail above, the global object service can process the request for a global object. Next, at 504, a query can be employed to identify global object providers capable of providing global objects in accordance with the request. As previously described, this query can be effected via a query component integral to the global object service upon a global object provider factory. The request can specify global objects which derive from a particular type. As well, if a type is not specified, all available global objects will be identified to match the request.

Once identified, at 506, global objects can be generated by the provider(s). It will be appreciated from the discussion herein that a global object factory can be employed facilitate in effecting the identification of the appropriate global object providers and therefore, the generation of the appropriate global objects. At 508, global objects which comply with the initial request can be delivered to a designer. As discussed, at 510, the system can next determine if the returned global object is serializable.

If at 510 a determination is made that the global object is serializable, the global object is retained at 512. If, on the other hand, a determination is made that the global object is not serializable, the global object is discarded at 514 as illustrated.

Figure 6:
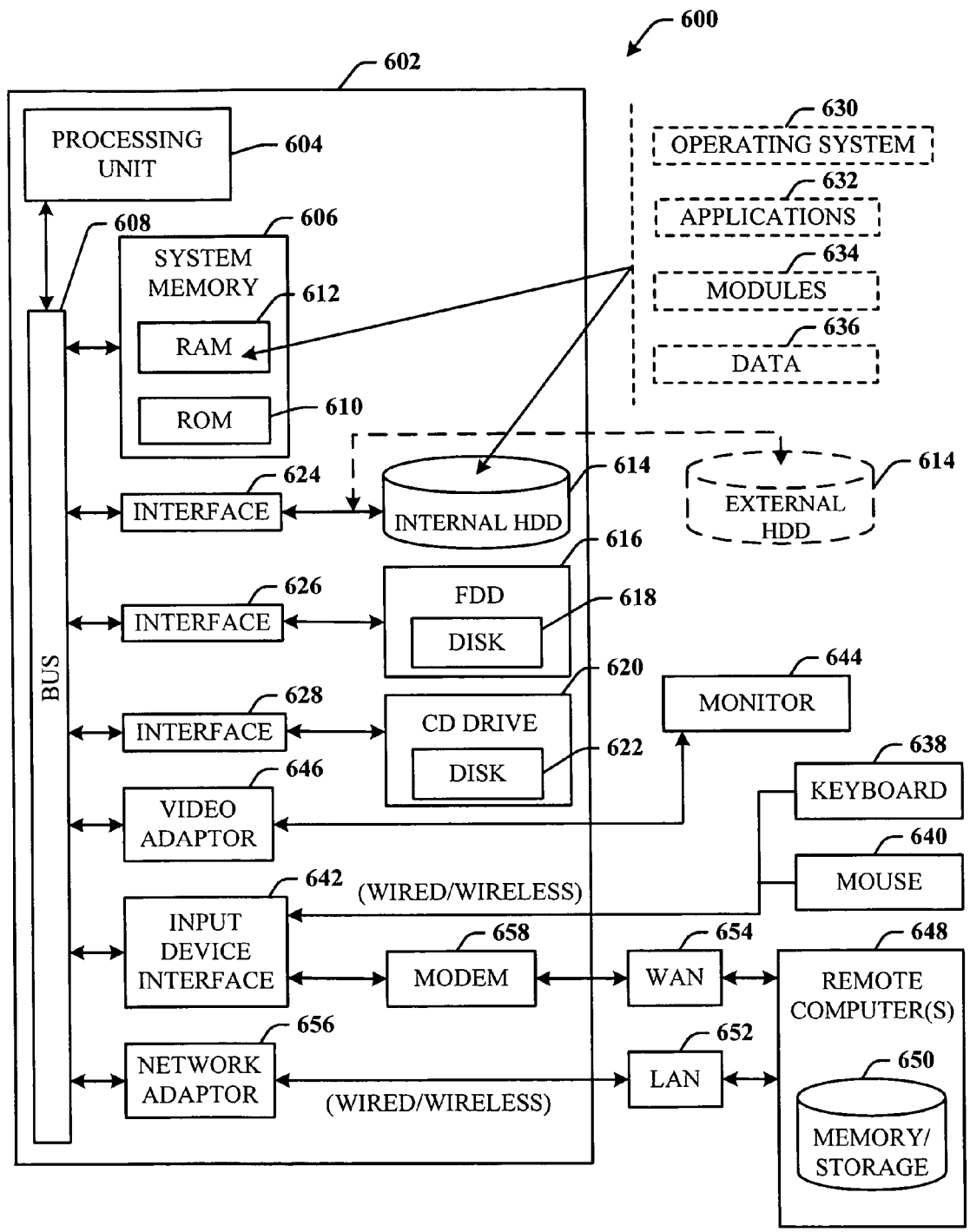
FIG. 6 illustrates a block diagram of a computer operable to execute the disclosed architecture.

Referring now to FIG. 6, there is illustrated a block diagram of a computer operable to execute the disclosed architecture. In order to provide additional context for various aspects of the subject invention, FIG. 6 and the following discussion are intended to provide a brief, general description of a suitable computing environment 600 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 6, there is illustrated an exemplary environment 600 for implementing various aspects of the invention that includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read only memory (ROM) 610 and random access memory (RAM) 612. A basic input/output system (BIOS) is stored in a non-volatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 612, including an operating system 630, one or more application programs 632, other program modules 634 and program data 636. All or portions of the operating system, applications, modules, and/or data can also be cached in the RAM 612. It is appreciated that the subject invention can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers etc.

The computer 602 may operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices, and companies, and facilitate enterprise-wide computer networks, such as intranets, all of which may connect to a global communication network, e.g., the Internet.

When used in a LAN networking environment, the computer 602 is connected to the local network 652 through a wired and/or wireless communication network interface or adapter 656. The adaptor 656 may facilitate wired or wireless communication to the LAN 652, which may also include a wireless access point disposed thereon for communicating with the wireless adaptor 656. When used in a WAN networking environment, the computer 602 can include a modem 658, or is connected to a communications server on the WAN 654, or has other means for establishing communications over the WAN 654, such as by way of the Internet. The modem 658, which can be internal or external and a wired or wireless device, is connected to the system bus 608 via the serial port interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 7:
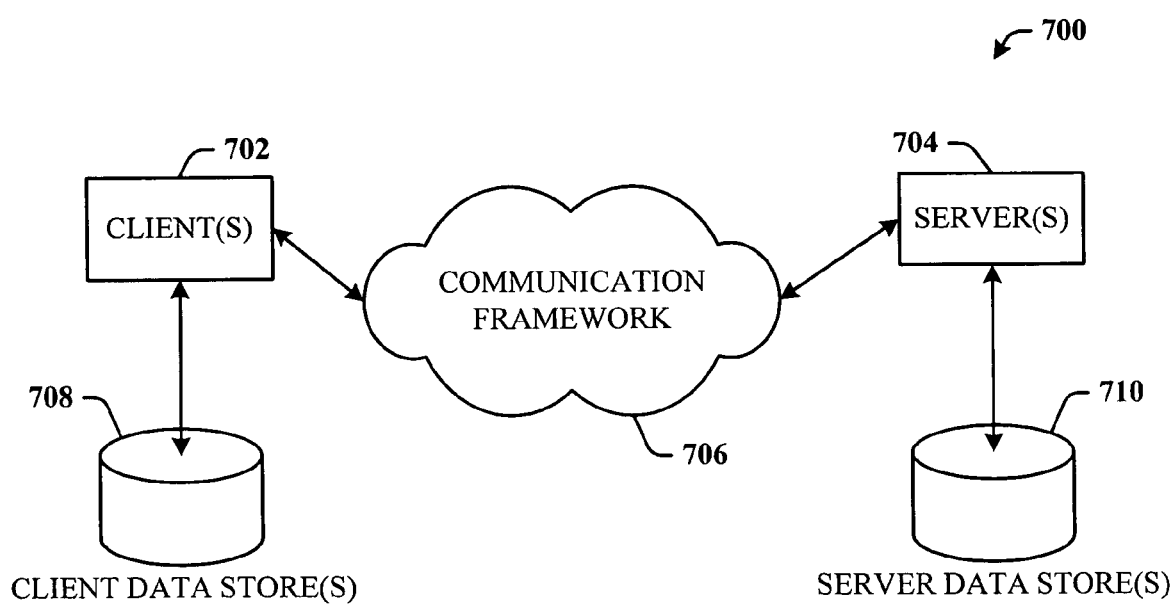
FIG. 7 illustrates a schematic block diagram of an exemplary computing environment in accordance with the subject invention.

Referring now to FIG. 7, there is illustrated a schematic block diagram of an exemplary computing environment 700 in accordance with the subject invention. The system 700 includes one or more client(s) 702. The client(s) 702 can be hardware and/or software (e.g., threads, processes, computing devices). The client(s) 702 can house cookie(s) and/or associated contextual information by employing the subject invention, for example. The system 700 also includes one or more server(s) 704. The server(s) 704 can also be hardware and/or software (e.g., threads, processes, computing devices). The servers 704 can house threads to perform transformations by employing the subject invention, for example. One possible communication between a client 702 and a server 704 can be in the form of a data packet adapted to be transmitted between two or more computer processes. The data packet may include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system stored in a computer readable storage medium, that facilitates employing global objects in a designer environment, comprising the following computer executable components:
   a global object service component that facilitates delivery of one or more global objects in response to a request, wherein the global object is available to all designers in a development project;
   one or more global object provider components that, in response to the request, generates the one or more global objects, the one or more global objects raise a pair of Changing and Changed events that cause a global object service running on a designer to announce to any references of a data source to update to a new value;
   one or more global object attribute components that declare the one or more global object provider components;
   a factory component that maintains the one or more global object provider components, wherein the factory component is located remote from the global object service component;
   a query component that generates a query that is employed in connection with identifying the one or more global object provider components from the factory component;
   an interface component that facilitates registration of the one or more global objects; and
   a table that identifies one or more global object provider components capable of generating global objects that derive from a predefined type, wherein the table is updated as a result from the query of the factory, and the global objects are undated in response to a change.

2. The system of claim 1, further comprising the one or more global object provider component fabricates at least one of a global object for a static class wrapping a resource file or a global object for a return value of each static property of a resource class.

3. The system of claim 1, wherein the global object service component records instance values and a location where an instance is applied to properties in a global object table.

4. The system of claim 1, further comprising, a Global Object API component that facilitates at least one of publication, modification or use of the one or more global objects further comprises.

5. The computer implemented system of claim 1, one of the one or more global objects is an XSD object.

6. The computer implemented system of claim 1, one of the one or more global objects is a RESX object.

7. The system of claim 1, wherein, the one or more global objects are explicitly tracked to achieve a successful serialization and deserialization.

8. The system of claim 1, wherein the factory component is accessed by the global object service component to build a list of providers that are employed to generate the one or more global objects.

9. The system of claim 1, wherein, the global object service component maintains a table of the one or more global objects associated with the table of the one or more global object provider components.

10. The computer implemented system of claim 1, the global object is a global type.

11. A user interface that employs the computer implemented system of claim 1.

12. A desktop computing system that employs the computer implemented system of claim 1.

13. A portable computing device that employs the computer implemented system of claim 1.

14. The system of claim 9, wherein, the global object service component listens to events on a global object when the global object is added to the table of the one or more global objects.

15. A computer-implemented method for sharing objects in a designer environment, the method comprising:
   requesting a global object that derives from a type, wherein the global object is available to all designers in a development project;
   identifying a global object provider capable of generating the requested global object, wherein a global object service identifies the global object provider from a list;
   generating the global object;
   delivering the global object;
   determining if the delivered global object is serializable;
   retaining or discarding the delivered global object based in part of the determination;
   raising a pair of Changing and Changed events that cause the global object service running on a designer to announce to any references of a data source to update to a new value;
   maintaining a plurality of global object providers, the plurality of global object providers maintained in a factory, wherein the factory is remote from the global object service;
   generating a query of the factory to facilitate identification of the global object provider from the plurality of global object providers;
   registering the global object;
   maintaining a table that includes the global object provider capable of generating the global object from a predefined type;
   updating the table as a result from the query of the factory; and
   updating the global object in response to a change.

16. The computer-implemented method of claim 15, wherein, the global object is an XSD (XML-Schema) object.

17. The computer-implemented method of claim 15, wherein, the global object is an RESX (resource extension) object.

18. The computer-implemented method of claim 15, further comprising retaining the global object when determined that the global object is serializable.

19. The computer-implemented method of claim 15, further comprising discarding the global object when determined that the global object is not serializable.

20. The computer-implemented method of claim 15, further comprising maintaining a table of global objects associated with the table that includes the global object provider.

21. The computer-implemented method of claim 20, further comprising listening to events on a global object when the global object is added to the table of the global objects.

22. A computer readable medium having stored thereon computer executable instructions for car in out the computer-implemented method of claim 15.

23. The computer-implemented method of claim 15, the global object is a global type.

24. A system that facilitates employing a global object in a designer environment, the system stored in a computer readable storage medium, comprising;
   means for requesting a global object that derives from a type, wherein the global object is available to all designers in a development project;

means for identifying a global object provider capable of generating the requested global object, wherein a global object service identifies the global object provider from a list;

means for generating the global object that derives from the type;

means for delivering the global object that derives from the type;

means for raising a pair of Changing and Changed events that cause the global object service running on a designer to announce to any references of a data source to update to a new value;

means for identifying the global object provider from a plurality of providers in a factory, wherein the factory is remote from the global object service;

means for automating the request for the global object based upon an inference;

means for registering the global object that derives from the type;

means for maintaining a table that includes the global object provider capable of generating the global object from a predefined type;

means for updating the table as a result from the query of the factory; and means for updating the global object in response to a change.

25. The system of claim 24, further comprising means for determining if the delivered global object is serializable.

26. The system of claim 25, further comprising means for retaining the delivered global object when determined that the delivered global object is serializable.

27. The system of claim 25, further comprising means for discarding the delivered global object when determined that the delivered global object is not serializable.

28. The system of claim 26, further comprising means for serializing the retained global object by adding metadata to a global object instance.

29. The system of claim 24, further comprising means for listening to change events for the global object.

30. A computer implemented system stored in a computer readable storage medium, that facilitates obtaining global objects in a designer environment, comprising the following computer executable components:

a global object service component that maintains a table of one or more global object provider components, the global object provider components are capable of generating global objects that derive from a predefined type;

a global object provider factory component that supplies the one or more global object provider components to the global object service component, the global object provider factory component is located remote from the global object service component, the one or more global object provider components comprising the global objects and a metadata component that corresponds to at least one of the global objects, wherein the global object is available to all designers in a development project and the global object raises a pair of Changing and Changed events that cause a global object service running on the designer to announce to a reference of a data source to update to a new value;

one or more global object attribute components that declare the one or more global object provider components;

a query component that generates a query to identify the one or more global object provider components from the global object provider factory component, wherein the table is updated as a result from the query of and the global objects are updated in response to a change; and an interface component that facilitates registration of the global objects.

31. The computer implemented system of claim 30, the global object service component scans components on a design surface to identify a properties that references an instanced global object and updates the reference to point to a new instance when a change event is raised.

32. The computer implemented system of claim 30, the global object provider factory builds a list of the global object providers that generate the global objects.

33. The computer implemented system of claim 32, at least one of the global objects is a global type.

34. The computer implemented system of claim 32, wherein, the at least one of the global objects are explicitly tracked to achieve a successful serialization and deserialization.

35. The computer implemented system of claim 32, at least one of the global object provider components is directed to one of project-level resource files and strongly typed datasets.

36. The computer implemented system of claim 30, wherein the global object service component queries for a serializer compatible with a global object returned in response to the query.

* * * * *